United States Patent [19]

McBride et al.

[11] 4,375,539

[45] Mar. 1, 1983

[54] SOLID BLOCKED CROSSLINKING AGENTS BASED ON 1,4-CYCLOHEXANE BIS(METHYLISOCYANATE)

[75] Inventors: Paul McBride, Aughton; George C. Russell, Aintree, both of England

[73] Assignee: Eastman Kodak Company, Rochester, N.Y.

[21] Appl. No.: 313,017

[22] Filed: Oct. 19, 1981

[30] Foreign Application Priority Data

Jul. 22, 1981 [GB] United Kingdom ............... 8122657

[51] Int. Cl.$^3$ .................. C08G 63/44; C08G 69/00; C08G 69/44; C08G 63/76
[52] U.S. Cl. .................................. 528/288; 525/440; 528/45
[58] Field of Search ...................... 528/288; 525/440; 528/45

[56] References Cited

U.S. PATENT DOCUMENTS

| 4,016,120 | 4/1977 | Matsuda et al. | 525/440 |
| 4,066,593 | 1/1978 | Czajka et al. | 525/440 |
| 4,246,380 | 1/1981 | Gras et al. | 525/440 |
| 4,305,996 | 12/1981 | Schenk | 525/440 |

*Primary Examiner*—Lucille M. Phynes
*Attorney, Agent, or Firm*—Donald W. Spurrell; Daniel B. Reece, III

[57] ABSTRACT

Disclosed are new compositions of matter obtained from the reaction of 1,4-cyclohexane bis(methylisocyanate) and certain active hydrogen containing compounds such as phenols, lactams, oximes and acetoacetates, and the use of these compositions in curing hydroxylated resins.

7 Claims, No Drawings

SOLID BLOCKED CROSSLINKING AGENTS BASED ON 1,4-CYCLOHEXANE BIS(METHYLISOCYANATE)

This invention relates to new derivatives of 1,4-cyclohexane bis(methylisocyanate) (CHBMI) which are non-reactive to active hydrogen compounds, but which become reactive when subjected to relatively low temperatures for short periods of time. These new compounds readily gel hydroxylated resins and thus are useful as crosslinkers for such resins in industrial coatings and related uses.

Coating compositions comprising the reaction product of a polyfunctional isocyanate and a resin containing isocyanate-reactive functionality such as hydroxyl groups are well known and widely used in industry. The isocyanate generally reacts very quickly with the resin at about room temperature and therefore, these components must be packaged, shipped and stored separately and mixed together only when the cross-linking reaction is desired. The disadvantages of such a system are obvious.

Proposed alternative generally embody the "one-pack" formulation concept wherein blending and packaging of the isocyanate and resin without premature interaction is the goal. In one such approach, relatively unreactive, phenol blocked isocyanate compositions which regenerate into free isocyanates upon heating have been used. With such formulations however, free phenol is produced upon heating with attendant undesirable odor, corrosiveness and toxicity. Moreover, many such blocked isocyanates require rather high temperatures for commencement of the curing. Thus, it is highly desirable to provide blocked isocyanate formulations which become reactive at low temperatures and without the liberation of undesirable by-products.

According to the present invention it has been found that solid, isocyanate adducts of formulas I and II below are highly useful in one-pack formulations in becoming reactive at relatively low temperatures to cross-link hydroxylated resins without attendant odor, corrosiveness and toxicity. These adducts are formed by reacting one mole of unsubstituted or substituted 1,4-cyclohexane bis(methylisocyanate) with two moles of a blocking compound having an active hydrogen, i.e., the precursor of A below, and preferably but not critically, in the presence of an amine catalyst and a solvent. The novel adducts have the formulae

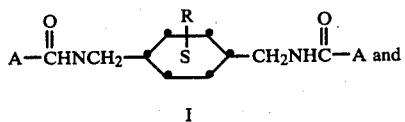

I

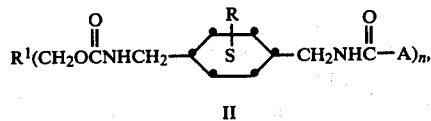

II wherein A is

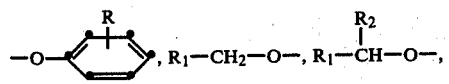

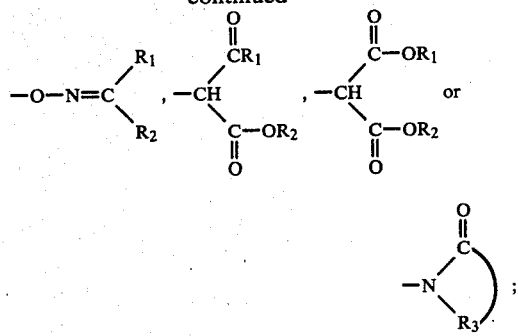

R is O to three of the same or different substituents selected from alkyl, —NR$_1$R$_2$, —NO$_2$, halogen, alkoxy, aryl, alkaryl and cycloalkyl; R$_1$ and R$_2$ are the same or different alkyl; R$_3$ is alkylene of from 2 to 8 carbons; R$^1$ is selected from alkyl, aryl, and cycloalkyl, such as trimethylol propane, and wherein each of the aforesaid alkyl moieties of R, R$_1$, and R$^1$ contains from 1 to 10 carbons and is straight or branched; and n is 2, 3 or 4.

These novel adducts in general have additional advantages in that they are (1) solids at room temperature and easily handleable, (2) aliphatic and thus less susceptible to thermal yellowing, (3) able to provide a wide choice of cure temperature/time schedules based on the choice of blocking agent selected, and (4) because of the relatively high —NCO content of the CHBMI per mole in comparison with many commercial isocyanate crosslinkers, less of the blocked CHBMI will be required to satisfy the stoichiometry of the hydroxylated resin.

The present adducts are conveniently prepared by mixing the active hydrogen compound with a suitable amine catalyst in a solvent such as toluene or acetone, and slowly adding the CHBMI thereto, preferably but not critically in stoichiometric amounts, and preferably but not critically with heating, usually for several hours, until precipitation of the solid product is essentially completed. A temperature of from about 50° to 120° C. is typical, and 80° to 100° C. is preferred. The crude product may then be recrystallized from suitable solvent such as toluene or acetone to yield pure adduct.

The compounds of formula II above are prepared by first reacting the CHBMI in excess with a polyfunctional hydroxy-containing compound and subsequently blocking the polyisocyanate thus formed with a suitable blocking agent in the manner described hereinabove.

If desired, the crosslinking of the hydroxylated resins using the present adducts can be catalyzed using known catalysts for isocyanate-hydroxyl reactions such as tertiary amines or organo tin or organo zinc compounds. The concentration of the adduct is usually about the stoichiometric equivalent for reaction with all of the hydroxyl groups on the polymer, but may be varied widely depending on the cure rate and cured coating properties desired. Typical hydroxylated polymers to which the present invention is applicable are disclosed, for example, in U.S. Pat. Nos. 3,659,003; 3,857,818; 3,912,691; and particularly U.S. Pat. No. 4,132,843 at columns 4 and 5, incorporated herein by reference. Particularly important are the polyesters which contain, in a co-condensed form, aliphatic and aromatic dicarboxylic acids having 4 to 12 carbon atoms and polyols having 2 to 10 carbon atoms and 2 to 4 primary or secondary hydroxyl groups. Saturated and unsaturated polyester resins of this type are described in Houben- Weyl "Makromolekulare Stoffe II" ("Macromolecular Materials II"), volume 14/2, pages 4 to 42. Crosslinking can occur over a broad temperature/time range varying, for example, from about 30 min. or more at 150° C. to about 10 min. or less at 180° C. depending on the resin, blocking agent and/or catalyst used. It is obvious that the flexibility in cure schedules allowed by the present adducts render them quite useful in areas such as industrial coating applications.

The present compounds, their preparation and use are illustrated in greater detail in the following examples which are illustrative only and are not intended to limit the invention in any way.

EXAMPLE 1

Synthesis of the Acetone Oxime Adduct of CHBMI

A mixture of acetone oxime (14.6 g.), triethylamine, (0.8 g.) and toluene (25 ml.) is stirred at about 18° C. To this solution is added 1,4-cyclohexane bis(methylisocyanate) (18.8 g.) over a period of about 30 seconds. The reaction is exothermic and a white precipitate appears. The mixture is heated with stirring for four hours at 80° C. to assure a complete reaction, and is then filtered and recrystallized from toluene, (50 ml.) leaving a white microcrystalline solid having the structure.

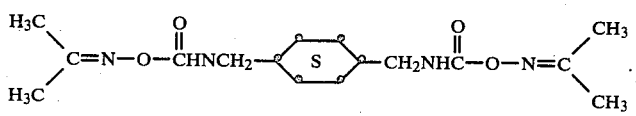

EXAMPLE 2

Synthesis of the Acetoacetic Ester Adduct of CHBMI

A mixture of ethyl acetoacetate (52 g.), triethylamine (1.0 g.), and toluene (25 ml.) is stirred at room temperature. To this solution is added 1,4-cyclohexane bis(methylisocyanate) (18.8 g.), with continued stirring over a period of about 30 seconds. The mixture is then heated to between 80°–100° C. for three hours, cooled, filtered and washed with ethyl acetate (27 ml.). The fine crystalline solid product is dried under reduced pressure and then recrystallized from acetate (50 ml.). The product is a white microcrystalline solid having the structure:

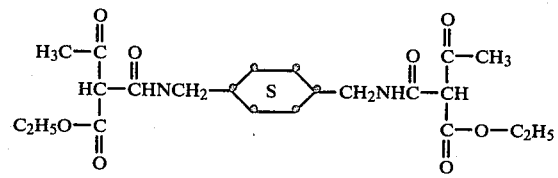

EXAMPLE 3

Evaluation of CHBMI Adducts as Crosslinkers for Hydroxylated Resins

A hydroxylated polyester based on trimethylpentanediol, trimethylol propane, isophthalic acid and adipic acid, having a Number Average, Molecular Weight (Mn) of 1,700 and an OH No. of 127 is used as the resin to be crosslinked. Mixes are made using this resin and a stoichiometric equivalent of each adduct, both with and without 2% by weight of a 1:1 molar mixture of dibutyl tin diacetate and hexadecyl trimethylammonium stearate as catalyst. The gel times for mixes at 140° C. are determined using a Ferranti-Shirley melt viscometer and are shown in Table 1.

TABLE 1

| | | GEL TIMES AT 140° C. | |
|---|---|---|---|
| | | Gel Time (Min.) | |
| Isocyanate Precursor | Blocking Agent | No Catalyst | Catalyzed |
| CHBMI | Acetoxime | 18.5 | 7.5 |
| CHBMI | Ethyl acetoacetate | 14.5 | 13 |
| CHBMI | Caprolactam | >20 | >20* |

*The CHBMI—caprolactam adduct gels the polyester in approximately 10 min. at 180° C.

EXAMPLE 4

Relative Amounts, by Weight, of Crosslinkers Required to Satisfy Stoichiometries of Hydroxylated Resins When used in a powder coating based on a commercially available hydroxylated polyester resin having an OH number of 56, only 20.5 g. of the CHBMI caprolactam adduct is required per 100 g. of resin for a stoichiometric reaction, the adduct having about 23% of its weight as available —NCO. In comparison, 36.5 g. of a commercial caprolactam-blocked, isophorone diisocyanate (CID) curing agent having an available —NCO content of 11.5% by weight, and 27.5 g. of a commercial caprolactam-blocked cycloaliphatic isocyanate, having an available —NCO content of 15.3% by weight is required. This advantage is illustrated in Table 3 below by formulation B (Table 2) utilizing the CHBMI-caprolactam adduct, compared to formulation A utilizing the aforesaid CID crosslinker, in regard to cured coating properties.

TABLE 2

| | Parts by Weight | |
|---|---|---|
| Components | A | B |
| Hydroxylated polyester resin, OH No. 56 | 73.3 | 83.0 |
| CID | 26.7 | — |
| Caprolactam blocked CHBMI | — | 17.0 |
| Di-Butyl Tin Dilaurate | 1.0 | 1.0 |
| Titanium Dioxide | 50.0 | 50.0 |
| Benzoin | 1.0 | 1.0 |
| Modaflow Powder (Monsanto-flow) aid) | 1.0 | 1.0 |

The performance of formulations A and B coated on a steel substrate 0.635 mm. thick and subject to a curing step for 15 minutes at 180° C. metal temperature is given in following Table 3, the measurements for each sample being obtained on the same test equipment by the same procedure.

TABLE 3

| Properties | A | B |
|---|---|---|
| Thickness (Mils) | 57 | 60 |
| 20°/60° Gloss | 61/93 | 71/93 |
| Pencil Hardness | F | F |
| Front/Reverse Impact Strength (in-lb) ASTM:D2794-69 | 68/4 | 140/36 |
| Orange Peel Rating (1 = Poor, 8 = Excellent) | 4–5 | 4–5 |

TABLE 3-continued

| Properties | A | B |
|---|---|---|
| Flexibility | No Cracking | No Cracking |

From Table 3, it can be seen that the CHBMI-cured material has superior impact strength, with the other properties being as good or better than the coating containing the commercial crosslinker at a much higher concentration.

EXAMPLE 5

Curing Properties of DIBK (Di-Isobutyl Ketoxime Blocked CHBMI at Different Temperatures As shown below in Tables 4 and 5, when used in a powder coating with hydroxylated polyester resin having an OH No. 59, DIBK to blocked CHBMI (Column C) produces a finished coating having lower orange peel and higher gloss than that obtained using a commercial, reduced temperature crosslinker (Column D).

TABLE 4

| Components | Parts by Weight | |
|---|---|---|
| | C | D |
| Hydroxylated polyester resin OH No. 59 | 70 | 70.3 |
| Caprolactam blocked polyfuntional isocyanate adduct having 15.3% available —NCO | — | 20.7 |
| CHBMI-DIBK Adduct (Theoretical % —NCO = 16.5) | 21 | — |
| Di-Butyl Tin Dilaurate | 10 | 10 |
| Titanium Dioxide | 50 | 50 |
| Benzoin | 1.0 | 1.0 |
| Modaflow Powder | 1.0 | 1.0 |

TABLE 5

| (A) After Curing for 15 Minutes at 160° C. (Metal Temperature) | | |
|---|---|---|
| Properties | C | D |
| Thickness (Mils) | 57 | 60 |
| 20° Gloss | 77 | 67 |
| Pencil Hardness | HB | HB |
| Front/Reverse Impact Strength | >160/>160 | >160/140 |
| Orange Peel Rating | 6 | 4–5 |
| Flexibility | No Cracking | No Cracking |

| (B) After Curing for 15 Minutes at 180° C. (Metal Temperature) | | |
|---|---|---|
| Properties | C | D |
| Thickness (Mils) | 42 | 34 |
| 20° Gloss | 76 | 42 |
| Pencil Hardness | HB | F |
| Front/Reverse Impact | >160/>160 | >160/>160 |
| Orange Peel Rating | 6–7 | 2–3 |
| Flexibility | No Cracking | No Cracking |

From the above examples and tables it can be seen that the blocked CHBMI crosslinkers impart superior properties to the cured coatings in many important areas such as gloss, impact strength and surface appearance. As will be appreciated, these properties are of major importance for commercial coating formulations.

The invention has been described in detail with particular reference to certain preferred embodiments thereof, but it will be understood that variations and modifications can be effected within the spirit and scope of the invention.

6. The method of curing hydroxylated polymeric material comprising mixing therewith a compound of claim 1 in a concentration sufficient to react with a substantial number of hydroxyl groups of the polymer, and thereafter heating the mixture to cause said reaction.
7. The method of claim 6 wherein the polymeric material is polyester.
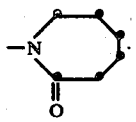

We claim:

1. A compound having the formula

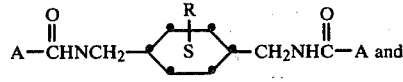

I

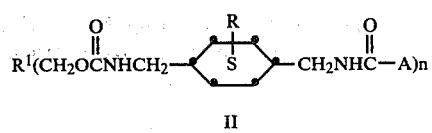

II wherein A is selected from

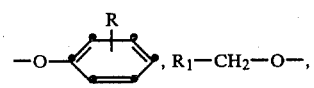

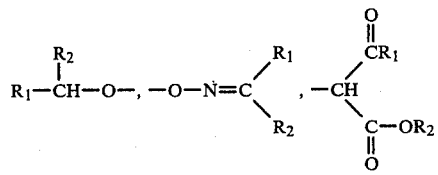

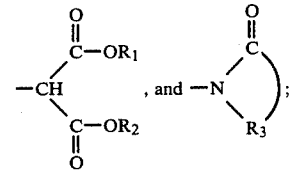

R is O to three of the same or different substituents selected from alkyl, —NR₁R₂, —NO₂, halogen, alkoxy, aryl, alkaryl and cycloalkyl; R₁ and R₂ are alkyl; wherein each of the aforesaid alkyl moieties or R, R₁ and R₂ contains from 1 to 10 carbons and is straight or branched; R₃ is alkylene of from 2 to 8 carbons; R¹ is selected from alkyl, aryl and cycloalkyl; and n is 2, 3 or 4.

2. A compound according to claim 1 wherein A is

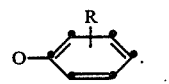

3. A compound according to claim 1 wherein A is

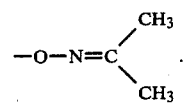

4. A compound according to claim 1 wherein A is

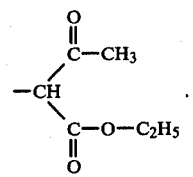

5. A compound according to claim 1 wherein A is